US005182084A

United States Patent [19]

Plester

[11] Patent Number: 5,182,084

[45] Date of Patent: Jan. 26, 1993

[54] PORTABLE AUTOMATIC WATER CARBONATOR

[75] Inventor: George Plester, Essen, Fed. Rep. of Germany

[73] Assignee: The Coca-Cola Co., Atlanta, Ga.

[21] Appl. No.: 495,411

[22] Filed: Mar. 19, 1990

Related U.S. Application Data

[63] Continuation-in-part of Ser. No. 465,644, Jan. 22, 1990, abandoned, which is a continuation of Ser. No. 108,684, Oct. 15, 1987, abandoned.

[51] Int. Cl.[5] .......... B01J 7/00

[52] U.S. Cl. .......... 422/105; 422/110; 422/111; 422/112; 422/113; 422/305; 422/238; 422/239; 261/DIG. 7; 426/561; 426/551; 426/591; 426/477; 99/323.1; 99/323.2

[58] Field of Search .......... 422/105, 110, 111, 112, 422/113, 305, 238, 239; 261/DIG. 7; 426/561, 551, 591, 477; 99/323.1, 323.2

[56] References Cited

U.S. PATENT DOCUMENTS

| | | | |
|---|---|---|---|
| 437,318 | 9/1890 | Thackeray | 99/323.1 |
| 1,810,672 | 6/1931 | Minrath | 422/160 |
| 2,073,273 | 3/1937 | Wetstein | 426/477 |
| 3,480,403 | 9/1969 | Hovey | 422/238 |
| 3,820,956 | 6/1974 | Titterington et al. | 422/238 |
| 4,040,342 | 8/1977 | Austin et al. | 99/323.1 |
| 4,186,215 | 1/1980 | Buchel | 261/DIG. 7 |
| 4,261,956 | 4/1981 | Adlhart | 422/239 |
| 4,304,736 | 12/1981 | McMillin et al. | 261/35 |
| 4,316,409 | 2/1982 | Adams et al. | 99/275 |
| 4,399,744 | 8/1983 | Ogden | 99/323.1 |
| 4,466,342 | 8/1984 | Basile et al. | 99/323.1 |
| 4,475,448 | 10/1984 | Shoaf et al. | 99/323.1 |
| 4,595,564 | 6/1986 | Spector et al. | 422/305 |
| 5,021,219 | 6/1991 | Rudick et al. | 422/112 |

FOREIGN PATENT DOCUMENTS

| | | |
|---|---|---|
| 168990 | 1/1986 | European Pat. Off. . |
| 7114 | 9/1879 | Fed. Rep. of Germany . |
| 45734 | 1/1889 | Fed. Rep. of Germany . |
| 2139910 | 11/1984 | United Kingdom . |

*Primary Examiner*—Robert J. Warden
*Assistant Examiner*—Stephanie Blythe
*Attorney, Agent, or Firm*—Birch, Stewart, Kolasch & Birch

[57] ABSTRACT

A portable carbonator includes a built-in $CO_2$ supply system which operates on disposable gas generating cartridges. The system requires no electrical power and is self-sufficient and automatic. $CO_2$ gas is generated by a chemical reaction between reagents which carbonates and/or propels the water. Whenever carbonated water is drawn, the reagents react and generate more $CO_2$ so as to maintain a constant pressure of the carbonated water.

24 Claims, 9 Drawing Sheets

CARBONATION

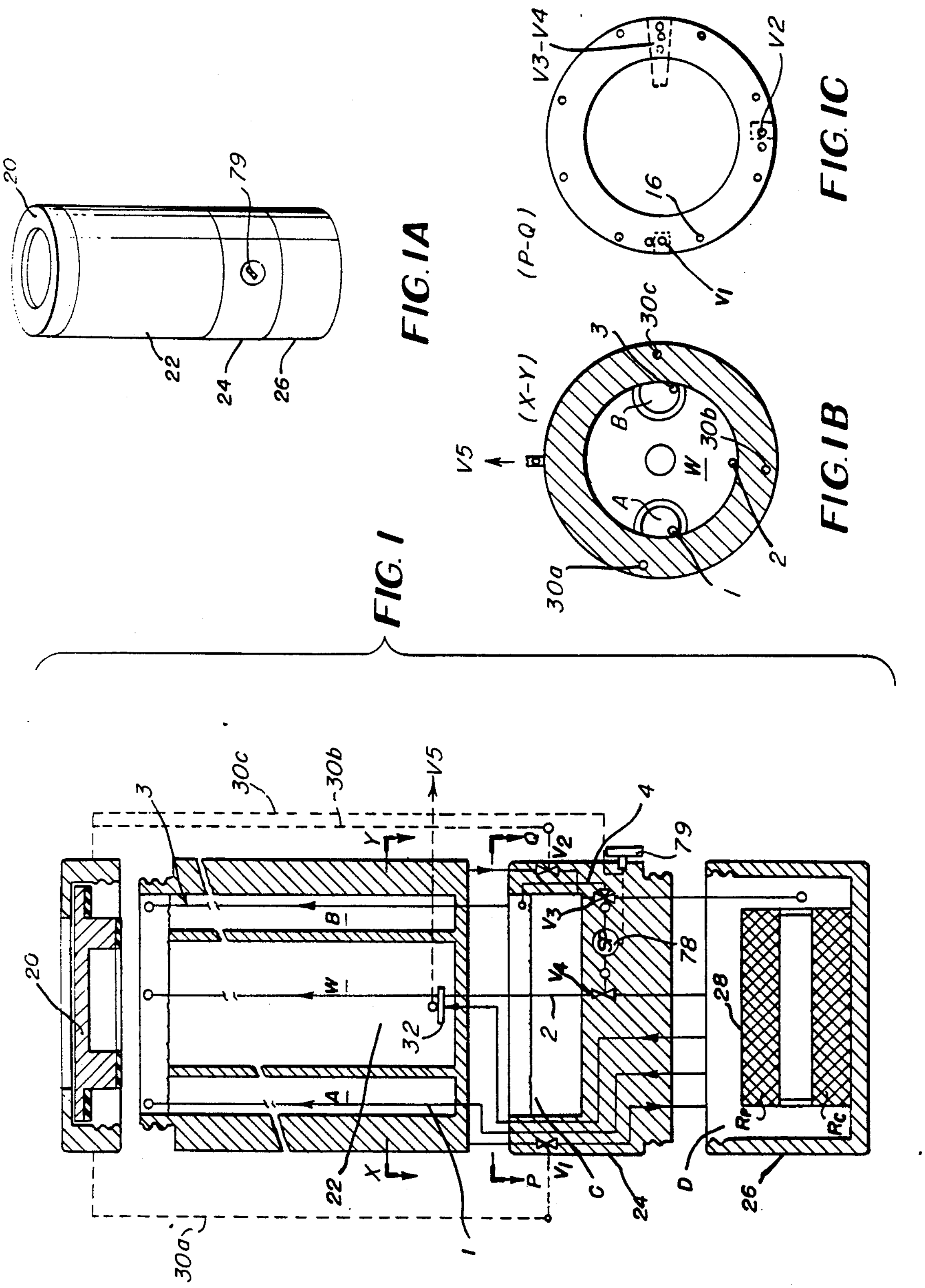
FIG. IA
20
79
22
24
26
FIG. IB
(X-Y)
V5
A
B
W
1
2
3
30a
30b
30c
FIG. IC
(P-Q)
V3-V4
V2
V1
16
FIG. I
20
22
24
26
28
30a
30b
30c
V5
A
B
W
C
D
X
Y
P
Q
V1
V2
V3
V4
1
2
3
4
32
78
79
Rp
Rc V1 or V2

DISPENSING

CARBONATION

PORTABLE AUTOMATIC WATER CARBONATOR

This application is a continuation-in-part of application Ser. No. 07/465,644 filed on Jan. 22, 1990 (now abandoned) which is a continuation of application Ser. No. 07/108,684 filed on Oct. 15, 1987 (now abandoned) and is related to Applicant's copending U.S. application Ser. No. 108,921 filed on Oct. 15, 1987 (now abandoned) and entitled "Supply of Controlled, Medium Pressure $CO_2$-Gas in Simple, Convenient Disposable Packaging".

BACKGROUND OF THE INVENTION

The present invention relates to a carbonator assembly which requires no electrical components and includes a $CO_2$ gas generator module which generates the gas by a chemical reaction.

The water carbonator, in combination with the conventional $CO_2$-cylinder, comprises a system, which is an essential part of those beverage dispensers which use syrup and water to produce a finished carbonated beverage. Conventional carbonator systems require complex controls firstly to ensure the correct degree of carbonation and secondly to provide a constant water pressure while dispensing. The latter is essential- for providing good control of the water-syrup dispensing ratio and a constant carbonation level while water is being drawn. Furthermore the conventional $CO_2$ supply comprises heavy, high pressure $CO_2$ cylinders which are necessarily returnable, refillable packages, are inconvenient to use, and require pressure controls and safety devices.

In home-dispensing, a non-pressurized or low-pressure $CO_2$ package is important, since it simplifies distribution through normal retail channels and provides qreater convenience foi the non-professional user. In addition, a conveniently designed carbonator for home-dispensing is one which is portable, can be filled at the user's sink, and be replaced into the dispenser after filling. Home dispensers are essentially simple devices, with few controls, and in the future some may be fitted into refrigerators, eliminating the need for separate cooling. This in turn implies the need for simple mechanical controls of the carbonation process. However, both the actual carbonation and the generation of gas for dispensing purposes should occur automatically, with minimum user manipulation. Otherwise, the advantages of simplicity and cost-effectiveness are counter-balanced by the lack of essential convenience.

SUMMARY OF THE INVENTION

Accordingly, it is a primary object of the present invention to provide a non-electric carbonator assembly, which carbonates water and propells the same to a station in a dispenser where it is mixed with concentrate, by the energy provided by $CO_2$ gas emitted by a chemical reaction between a plurality of reagents.

It is another object of the present invention to provide a carbonator assembly which delivers carbonated water at a substantially constant pressure.

The present invention achieves these objects by use of a substance, such as sodium bicarbonate, which in contact with an acid, such as citric or phosphoric acid, releases carbon dioxide. The two components can be mixed as powders, so that carbon dioxide is generated when water is added. Alternatively, one or both components can be dissolved in water and thereafter gas generation occurs when the two solutions are mixed together. Details of a suitable $CO_2$ gas generator are also fully disclosed in the aforementioned copending application of Applicant.

Chemical generation of $CO_2$ gas is generally known. Also known are devices, which use this form of gas-generation to carbonate water to a predetermined degree. These are mostly inconvenient, because they often involve the user in an unacceptable degree of manipulation. Also they are not usable in place of the conventional carbonator/$CO_2$ cylinder system found in beverage dispensers, since they have no means of maintaining a constant pressure within the carbonator once water is being drawn to feed the dispenser.

The system described herewith enables the design of a portable carbonator, complete with a built-in $CO_2$-supply system, which operates on disposable gas generating cartridges. The system requires no electrical connections and is self-sufficient, and automatic. It demands a minimum amount of manipulation by the user and requires him simply to fill the carbonator, insert the cartridge and replace the cartridge cover and carbonator lid. Nonetheless, once the carbonator is closed, it proceeds to carbonate the water to the correct level, and whenever water is drawn, it reacts by generating more $CO_2$ so as to maintain a constant pressure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is an exploded view of a first embodiment of a carbonator assembly of the present invention;

FIG. 1A is a perspective view of the assembly of FIG. 1 in its assembled state;

FIG. 1B is a sectional view along line X—Y of FIG. 1;

FIG. 1C is a sectional view along line P—Q of FIG. 1;

DETAILED DESCRIPTION OF PREFERRED EMBODIMENTS

Basic Principles

Figure 1D:
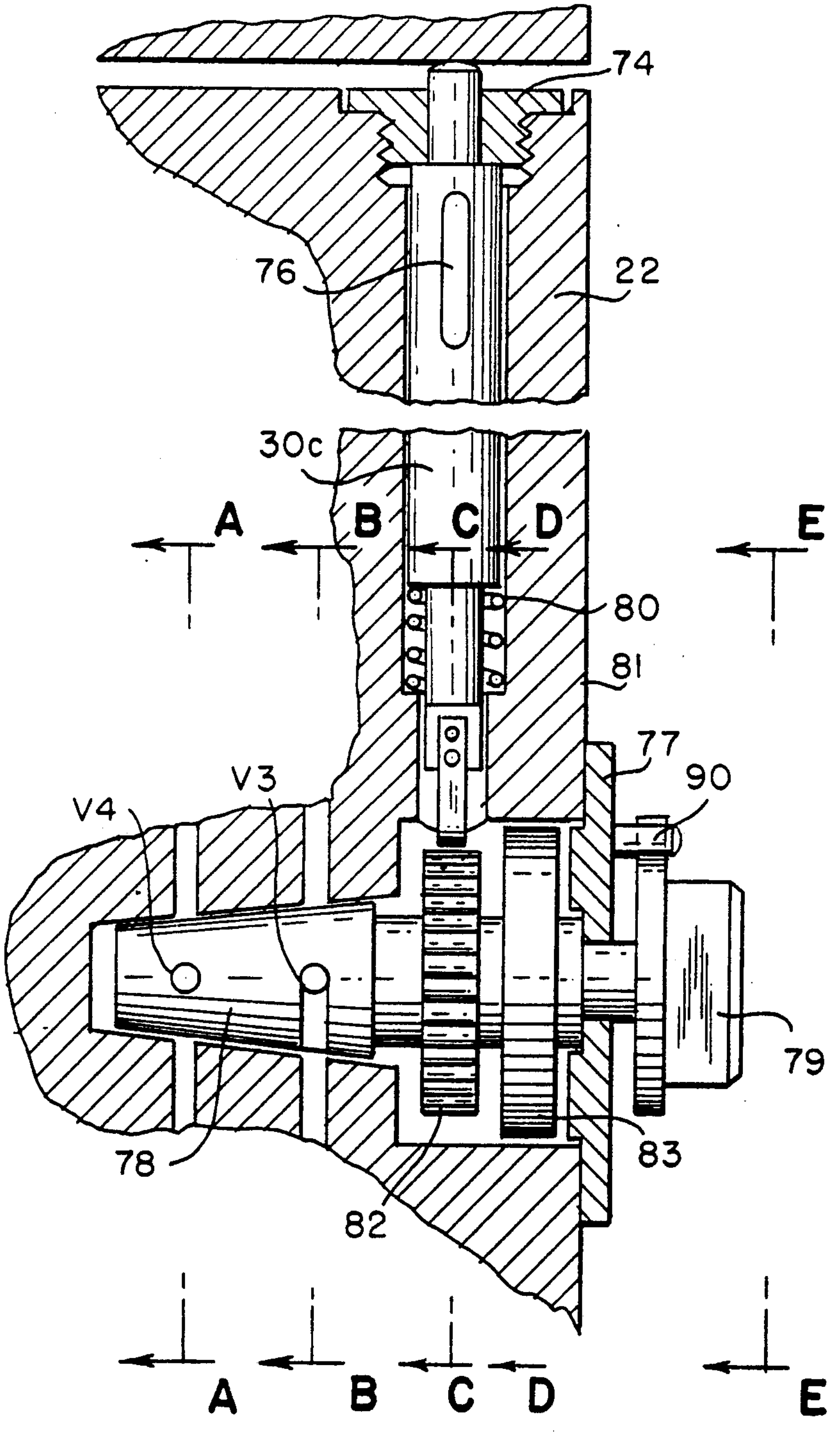
FIG. 1D is a partial vertical section of the FIG. 1 assembly containing valves $V_3$, $V_4$.

The basic principles are illustrated, by way of example, by FIG. 1 and FIGS. 1A to 1H.

The carbonator consists of a lid 20, a main body 22, an intermediate section 24 having a chamber C formed therein (which houses the pressure-regulating "memory" and the internal channels) and a base 26 into which the $CO_2$-generating cartridge 28 is inserted. These three sections are shown apart in an "exploded" view in FIG. 1 to simplify the description. The $CO_2$-generating cartridge 28, in the particular example shown, comprises two separate parts. Each of these two parts consists of pellets of a mixture of sodium bicarbonate and citric acid (or another suitable solid acid) in a perforated outer package. An air-gap is present between the two parts and one is mounted above the other. In the lower part, reagent $R_c$ has the correct proportions for securing the necessary level of water carbonation. In the upper part, reagent $R_p$ is proportioned so as to provide adequate gas quantities for propulsion and displacing the entire contents of the carbonator to the dispensing point shown as valve V5, while maintaining the required pressure.

In the carbonating section, a chemical reaction occurs in which all of the chemicals are mixed in a single-step and thus produce a predetermined volume of $CO_2$. This volume of $CO_2$ is exactly that needed for achieving the desired degree of carbonation in the water. According to the initial temperature of the water, the pressure of the system will rise to reflect saturation pressure for the predetermined degree of carbonation. The reaction proceeds to completion and is not limited by saturation pressure, since most of the reaction systems (e.g. citric acid and sodium bicarbonate) are not limited by pressure.

In the pressure regulating section $CO_2$ is provided to the head space of a large chamber W and maintains the head space therein at a constant pressure. While the pressure regulating $CO_2$ is fed directly to the head space of the carbonator, the carbonating $CO_2$ is sparged directly into the water (at 32) and thus enters the tank by a separate channel. The required pressure control occurs by the repetitive mixing and separating of the reacting chemicals, whereby chemicals mix until the pressure is achieved and then separate to bring the reaction to a stop. Saturation does not play a role in this process.

The main body 22 consists of the large chamber W mentioned above, which contains the carbonated water and two small chambers A and B, which contain reagent water. All three chambers are filled simultaneously, when the correct water level is reached in the carbonator. The lid 20 simply screws down and seals onto the top of the main vessel and seals the chambers A and B separating them from each other and from W, once the lid is secured.

Furthermore, the lid 20 presses down on spring rods 30a, 30b and 30c (FIG. 1B) which run down inside the walls of the main body and open valves $V_1$ and $V_2$ via rods 30a and 30b, respecitvely, as soon as the lid is fully closed. A three-way valve $V_3$ is normally open to Vent 4 (leading to the top of chamber C formed within intermediate section 24) this position being ensured by spring pressure from spring 80. When the lid 20 is replaced, the third vertical rod 30a, presses against spring 80 forcing a leaf spring 81 into engagement with a ratchet 82 (FIG. 1D) and prevents the spring 80 from releasing the valve $V_3$, once the valve is set in another position. The user can thus change the position of valve $V_3$ during operation (see FIG. 1E) and it springs back to its normal position only when the lid 20 is removed.

The base section 26 can be unscrewed from the intermediate section 24, so that the cartridge 28 comprising reagents $R_c$ and $R_p$ can be inserted. The user inserts the cartridge 28 before closing the lid 20 of the main chamber W.

The system described can be constructed of molded plastic parts, with built-in channels for the various flows shown and the three valve-actuating rods 30a, 30b, 30c. The three valves $V_2$, $V_3$, $V_4$ consist of simple plug-cocks and are inserted in prepared borings in the side of the central casting which also contains chamber C.

System Operation

The system operates as follows. As soon as the lid 20 is replaced, valve $V_1$ opens and the water in chamber A discharges into chamber D flooding the lower part $R_c$ of the reagent cartridge 28. Simultaneously, the water in chamber B flows into chamber C. The reagent $R_c$ gradually releases $CO_2$ through a diffuser 32 such as a porous pad to effect the required carbonation level in the water in chamber W. The head-pressure in chamber C at the end of the carbonation cycle is equal to that in chamber D and the whole system now reaches pressure equilibrium. Chamber C communicates with chamber D via valves $V_3$ and $V_4$.

In FIG. 1D, valves $V_3$ and $V_4$ are attached by the same spindle 78 to switch 79. On spindle 78 are mounted the ratchet 82 and a coiled-spring 83. The switch 79 is free to rotate between two positions including a DISPENSE position and a CARBONATE position. The switching limits of switch 79 are defined by stop members 90 and 91 at twelve and three o'clock positions, respectively, on the face of back-plate 77. Linkage rod 30c is vertically guided by a runner 76 and is pressed up to a limiting position represented by a retaining nut 74 by means of the upward pressure of spring 80. When switch 79 is rotated in either a clockwise or counterclockwise direction, valves $V_3$ and $V_4$ turn together since they are mounted on the same spindle 78.

Figure 1E:
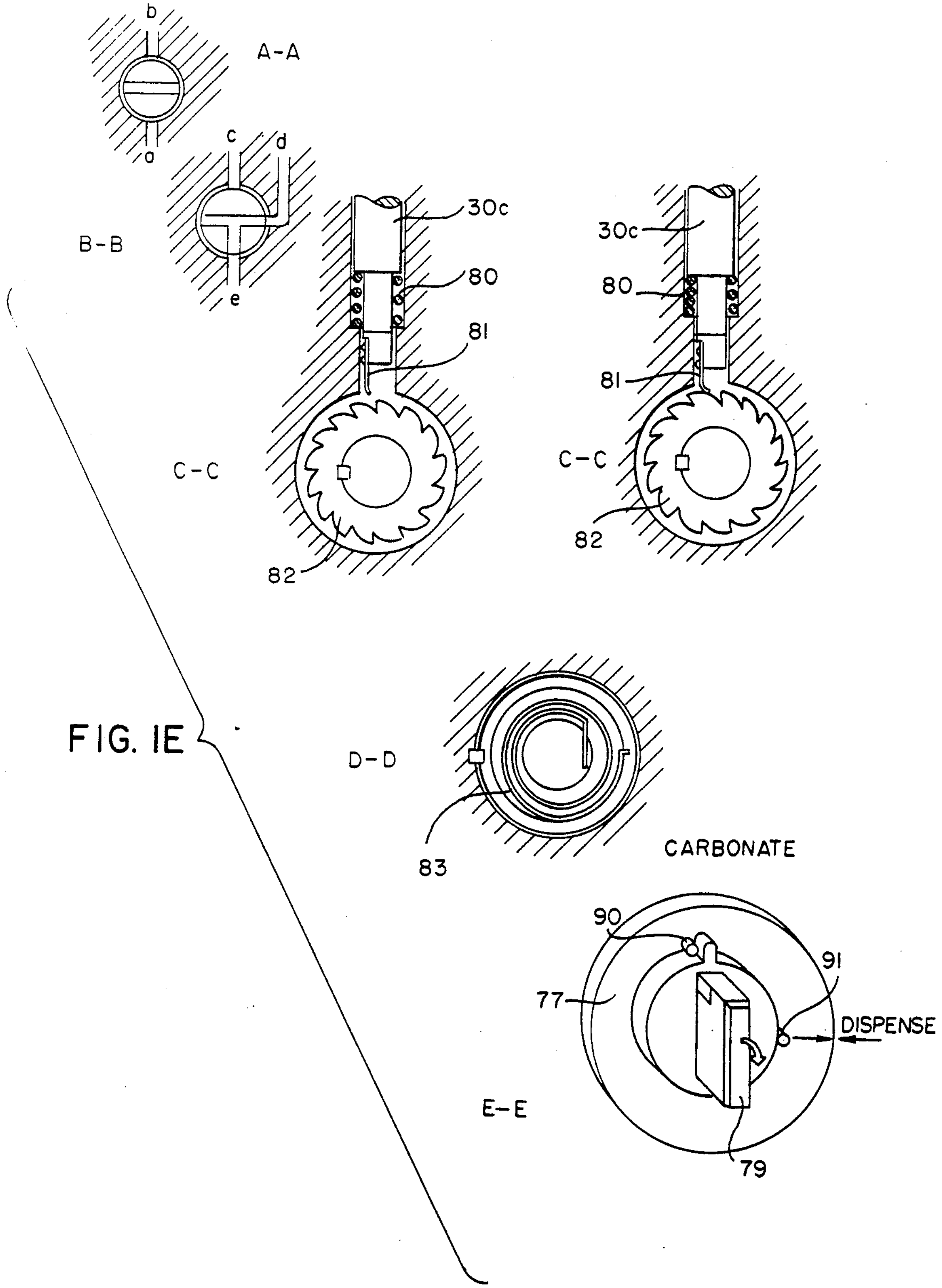
FIG. 1E is an exploded sectional view along lines A—A, B—B, C—C, D—D, and E—E of FIG. 1D.

Valves $V_3$ and $V_4$ are simple plug-cocks whereby $V_4$ is 2-way and $V_3$ is 3-way. Sections A—A and B—B in FIG. 1E show the valves in a carbonate position, where the plug of valve $V_4$ is positioned so as to close the flow between valve ports "a" (to chamber D) and "b" (to VENT 2) and where the plug of valve $V_3$ is simultaneously positioned so as to open the path between ports "e" (to chamber D) and "d" (to VENT 4). When the switch 79 is turned to a DISPENSE position, the plug of valve $V_4$ is turned to enable a flow path between ports "a" and "b" while simultaneously the plug of valve $V_3$ is turned to enable a flow path between ports "c" (to chamber C) and "e" (to chamber D).

FIG. 1E shows further sections of FIG. 1D. Section C—C shows the operation of ratchet 82 which is either disengaged from the leaf-spring 81 when linkage rod 30c is pressed up by spring 80 or alternatively restrained by leaf-spring 81 when the linkage rod 30c is pressed down by lid 20. Both alternative positions of linkage rod 30c are shown. Section D—D shows the coiled spring 83 and section E—E shows the two-position switch 79 against its back-plate 77.

When lid 20 is closed and presses down on linkage rod 30c, the leaf-spring 81 engages with ratchet 82. At the appropriate time when the switch 79 is turned to DISPENSE, the coiled spring 83 is tensioned and restrained by ratchet 82. As soon as lid 20 is opened, the linkage rod 30 is pushed up by spring 80 thereby disengaging the leaf-spring 81 from the ratchet 82. This action enables spring 83 to uncoil and automatically return the switch 79 to the CARBONATE position whereby the next batch of water will be carbonated.

Figure 1G:
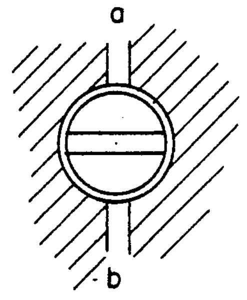
FIG. 1G is a sectional view along line A—A of FIG. 1F.
Figure 1F:
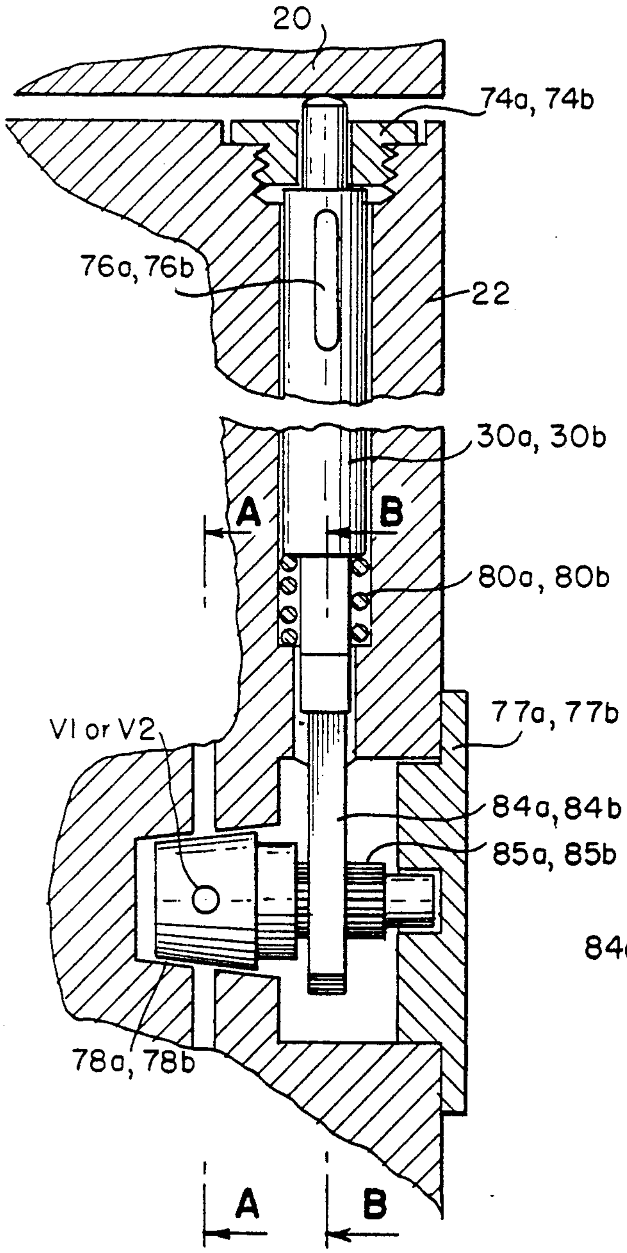
FIG. 1F is a partial vertical section of the FIG. 1 assembly containing valves $V_1$ and $V_2$.
Figure 1H:
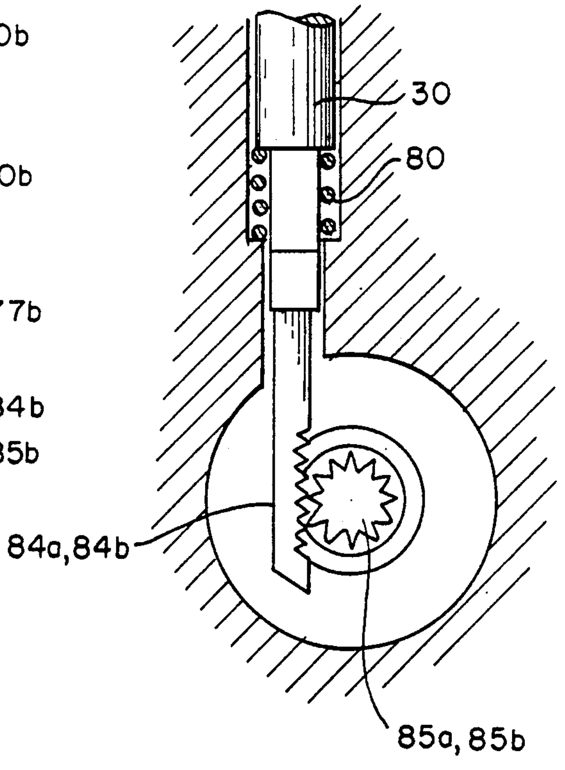
FIG. 1H is a sectional view along line B—B of FIG. 1F.

FIGS. 1F, 1G and 1H show the relationship of linkage rods 30a and 30b to valves $V_1$ and $V_2$, respectively. Both of valves $V_1$ and $V_2$ are simple one-way plug-cocks. Section A—A in FIG. 1G shows the valve ($V_1$ or $V_2$) in a closed position. When the valve is rotated, it opens the flow between ports "a" and "b". Linkage rods 30a, 30b are mounted in a similar manner to that already described in FIGS. 1D and 1E, except that in place of the leaf-spring (83 in FIG. 1E), a toothed rack 84a, 84b respectively 84 is attached to an extension of rod rods 30a, 30b. A modified valve spindle 78a, 78b respectively incorporates only one valve ($V_1$ or $V_2$) in contrast to the arrangement in FIG. 1D which shows valves $V_3$ and $V_4$ on the same extended spindle 78. The valve spindle 78a, 78b, respectively has a pinion 85a, 85b which engages rack 84a, 84b, respectively. The assembly is retained by a back-plate 77a, 77b, respectively.

When the lid 20 presses linkage rods 30a, 30b downwards, the rods rotate a respectively pinion 85a, 85b by the downward motion of rack 84a, 84b and opens valve $V_1$ (or $V_2$) by turning it to a position shown in 1G. When lid 20 is removed, linkage rods 30a, 30b move upward due to the pressure of spring 80a, 80b and automatically closes valve $V_1$ (or $V_2$), respectively.

The carbonator can be placed into the dispenser either while carbonating or at the end of the carbonation cycle. A simple, self-sealing push-in connector at the base fits into a mating coupling in the dispenser. A dispensing valve V5 in the dispenser is in liquid communication with the push-in connector and when OPENED dispenses a beverage into a receptacle. For dispensing to begin, the user simply switches switch 79 to the dispensing position as shown in FIG. 1E and opens valve V5. From that moment, whenever water is drawn out of the carbonator and the pressure in the carbonator drops, the pressure in chamber D also drops and water enters chamber D from chamber C through valve $V_3$, since chamber C is now at a higher pressure. The water floods the cartridge $R_p$ and generates $CO_2$ until the pressure in chambers W and D have attained equilibrium with the reference pressure in chamber C. When pressure equilibrium has been reached, the water is pushed back into chamber C through valve $V_3$ and the reaction stops. The process repeats itself whenever the pressure in W drops below the reference pressure in C. This reference pressure acts as a pressure "memory" and the pressure "memory" is set by the system itself after carbonation is complete. Thus, the apparatus enables chemicals of $R_p$ to mix and react forming $CO_2$ until a predetermined $CO_2$ pressure is reached whereupon the reaction is automatically stopped by separating the chemicals. The chemicals then come together again as soon as the $CO_2$ pressure falls below the predetermined pressure. The predetermined pressure is, therefore, referred to as the "pressure memory" since the system is pre-pressurized to this level and thereafter reacts to maintain this pre-pressure.

FIGS. 6A through 6F show the five operating positions, respectively, of the carbonator in FIG. 1.

Figures 6A, 6B, 6C:
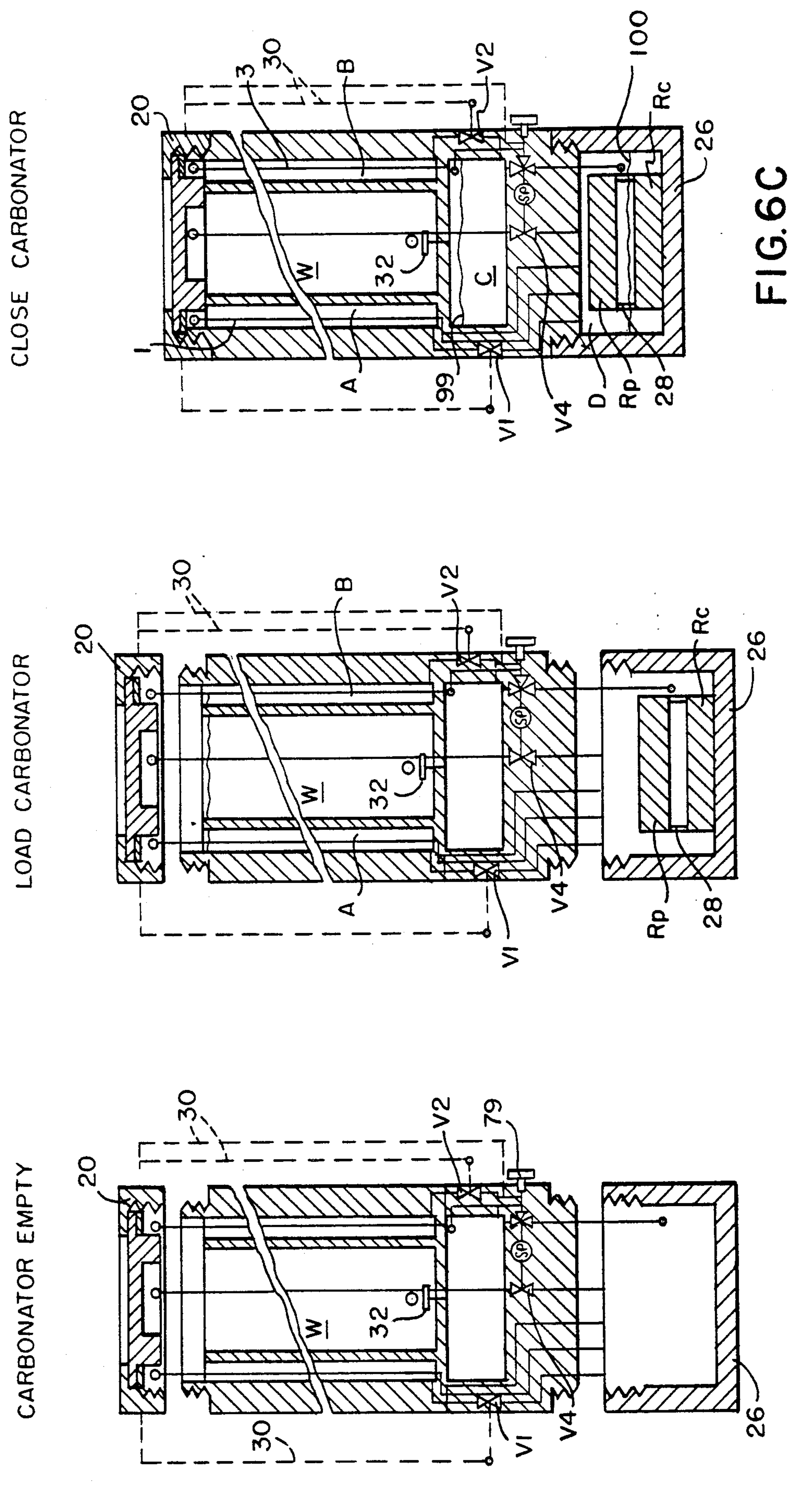
FIGS. 6A through 6E show five operating positions of the carbonator assembly for use in the present invention.

In the CARBONATOR EMPTY position of FIG. 6A, (hereinafter referred to as position I), the carbonator is empty and both the lid 20 and base 26 have been removed for refilling. In position I, the linkage rods 30 of valves $V_1$ and $V_2$ have been pressed upwards by their respective springs in a manner already described with the result that both of valves $V_1$ and $V_2$ are closed. Similarly, linkage rod 30a has also been pressed up with the result that valve $V_4$ is closed and valve $V_3$ is opened to the CARBONATE position already described.

In the LOAD CARBONATOR position of FIG. 6B, (hereinafter referred to as position II), water is introduced into vessel W and overflows to fill vessels A and B. Cartridge 28 is then inserted into base 26. Since valves $V_1$ and $V_2$ are closed, water will not flow out of vessels A and B. The fine porous pad 32 resists the flow of water therethrough since its pores are filled with gas resulting in a surface tension greater than that of the water.

In the CLOSE CARBONATOR position of FIG. 6C, (hereinafter referred to as position III), the base 26 is screwed onto intermediate portion 24 and the lid 20 is also replaced. As soon as lid 20 is replaced, linkage rods 30a, 30b, 30c are pressed down and valves $V_1$ and $V_2$ are both opened. Since vessel A is vented to vessel D through Vent 1 and valve $V_1$ is open, water flows from vessel A to vessel D to a level 100, covering the lower portion $R_c$ of the cartridge 28. The cartridge 28 contains $CO_2$ generating chemicals such as citric acid and sodium bicarbonate in exactly the right proportions so that the predetermined volume of water contained in vessel A, when released into the chamber D of the base 26 will cause a precise amount of $CO_2$ to be generated for carbonating the water in vessel W. Since vessel B is vented to vessel C through Vent 3 and valve $V_2$ is also open, water will simultaneously flow from vessel B to vessel C to the level shown at 99 therein.

Figure 6E:
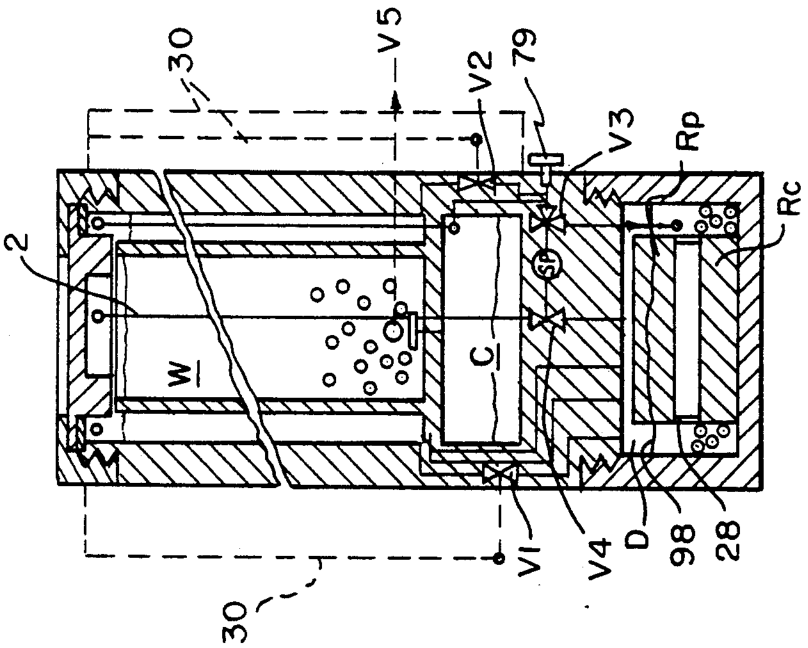
Figure 6D:
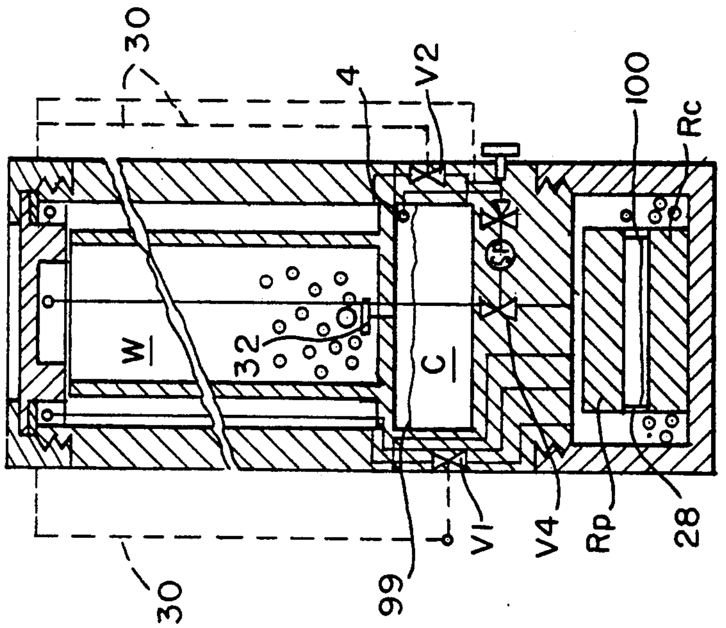

In the CARBONATION position of FIG. 6D, (hereinafter referred to as position IV), $CO_2$ is released from the lowest part $R_c$ of the cartridge 28 and enters the water in vessel W through diffuser 32. At the same time, $CO_2$ enters through valve $V_3$ into the head-space of vessel C through Vent 4, thereby ensuring that vessel C is maintained at the same pressure used for carbonating.

In the DISPENSING position of FIG. 6E, (hereinafter referred to as position V), the switch 79 is turned to the DISPENSE position by the user thereby opening valve $V_4$ and venting vessel D to vessel W through Vent 2 and applying the same pressure in the head-space of vessel W as in vessel D. Valve $V_3$ simultaneously rotates thereby enabling the water in vessel C to flow down to vessel D. Upon placing the system in a "Ready" or "Dispense" condition, withdrawal of a carbonated beverage may occur through a remote dispensing valve V5, such as a typical valve in a dispenser. Actuation of the dispensing valve V5 to an OPEN position will deplete the carbonated water in vessel W, thereby requiring compensation to the increased head-space formed therein by the provision of additional $CO_2$ gas. Thus, when water contacts the second part $R_p$ of cartridge 28 through Valve V3, which cartridge portion $R_p$ is similarly composed of $CO_2$ producing chemicals as the lower part $R_c$, $CO_2$ is generated until the head-pressure in vessel W is restored and water flows from vessel C to vessel D to contact cartridge part $R_p$ and produce more $CO_2$, thus maintaining in the head-space of vessel W at the pressure originally produced during carbonation in position IV. In this manner, the carbonated water in vessel W is conveyed at a constant pressure to the dispensing outlet through valve V5 until vessel W is empty.

In summary an integral sequence of events occurs to enable dispensing of a quality carbonated beverage from remote valve V5 with only minimal manual intervention at two separate states of operation. Upon closing of the carbonator lid 20 and securing of the cartridge-containing base 26 to the intermediate section, very simply, the switch 79 is at an initial CARBONATE position and water is introduced via valve V1 to the chamber D and water is simultaneouly introduced via valve V2 to chamber C. The chemical reaction in chamber D begins immediately, completely carbonating the water in chamber W through sparger 32. To enable a dispensing operation, switch 79 is turned to a DISPENSE position. This manual intervention causes valve $V_4$ to open thereby venting vessel D to vessel W and correlating the pressure between the two vessels through Vent 2. When carbonated water is dispensed through dispensing outlet valve V5, the carbonated water in chamber W is depleted. This depletion is sensed due to the vented relationship between vessels W and D. At the time of manual selection of the DISPENSE operation, vessel C is enabled to communicate with vessel D through valve V3, causing water from vessel C to enter vessel D to a level 98 shown in FIG. 6E for interaction with chemicals $R_p$. The carbon dioxide generated at this time is released to the headspace in vessel W through valve V4. Each time a withdrawl of carbonated water from vessel W occurs, the headspace created therein is compensated for by the introduction of $CO_2$ gas. The sequence of events continues until carbonated water is completely depleted from vessel W.

Figures 2A, 2B, 2C:
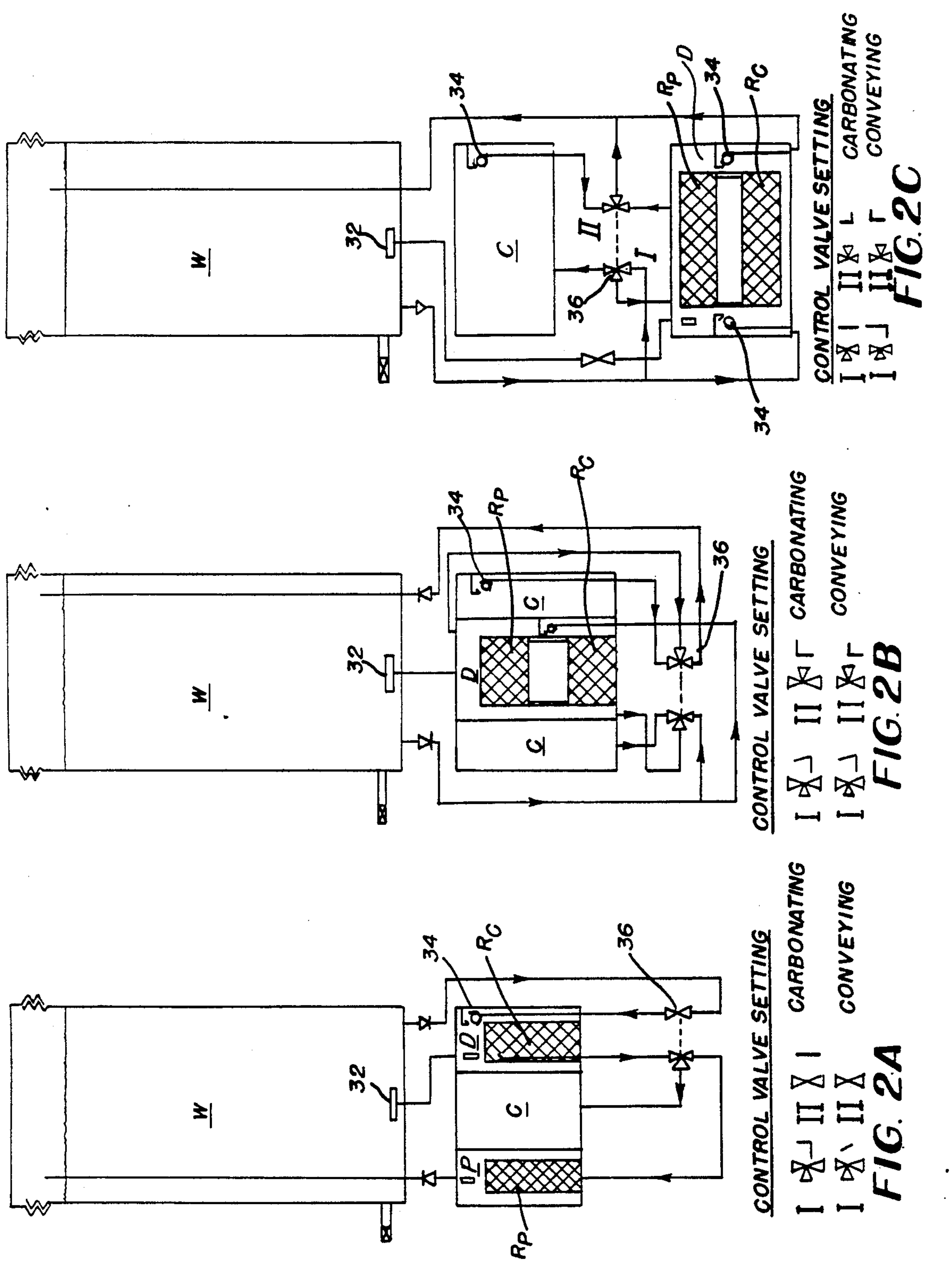
FIGS. 2A to 2C illustrate additional embodiments of the present invention.

These basic principles can be applied in a variety of different modes. FIGS. 2A, 2B and 2C show other examples. Like elements refer to like parts throughout the Figures for the sake of simplicity and clarity.

In FIG. 2A, water flows from chamber W to the carbonating chamber D. A ball float 34 prevents the chamber from over-filling. The resulting reaction carbonates the water in chamber W. In addition, $CO_2$ flows into the pressure-reference chamber C and, as carbonation is complete and propellant $CO_2$ is needed the user switches the control valve 36. Water from chamber C now enters the second reacting chamber $R_p$ and generates $CO_2$ until the pressure in W and $R_p$ is in equilibrium with the pressure in C. The water is now expelled back to C and the reaction stops. The process repeats itself every time the pressure in W drops.

In FIG. 2(*b*), water flows from chamber W into reaction chamber D and also into pressure reference chamber C which forms on outer ring around D. Ball floats 34 prevent overfilling in chambers D and C. The resultant reaction carbonates water in chamber W via diffuser 32. In addition $CO_2$ flows into the pressure reference chamber C and as carbonation is complete and propellant $CO_2$ is needed, the user switches control valve 36. Water from chamber C now enters the reaction chamber D to effect a second stage generation of $CO_2$ gas until pressure in the head space of chamber W reaches an equilibrium with pressure in the head space of pressure reference chamber C.

In FIG. 2C, water flows from W into C and D simultaneously and ball-floats 34 prevent over-filling. After carbonation the user switches the control valve 36 and water flows into the reagent chamber D through an orifice and directly impinges on the propellant reagent $R_p$. As soon as the pressure in D has reached equilibrium with C, the water flow stops, and the reaction stops. The water level in chamber D gradually rises until all reagent $R_p$ is exhausted.

Horizontal Carbonator

Figure 3A:
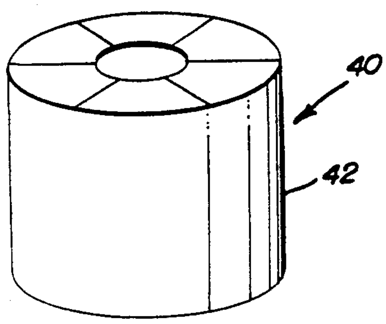
FIGS. 3A and 3B illustrate the structure of a gas generating capsule for use in the carbonator assembly of the present invention.
Figure 3B:
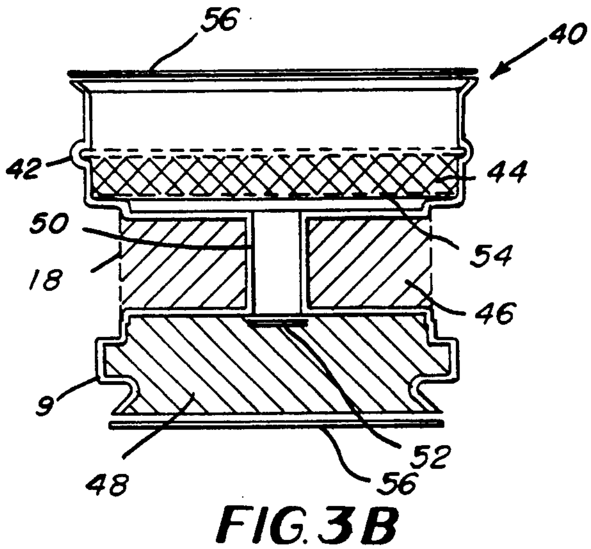
Figure 4:
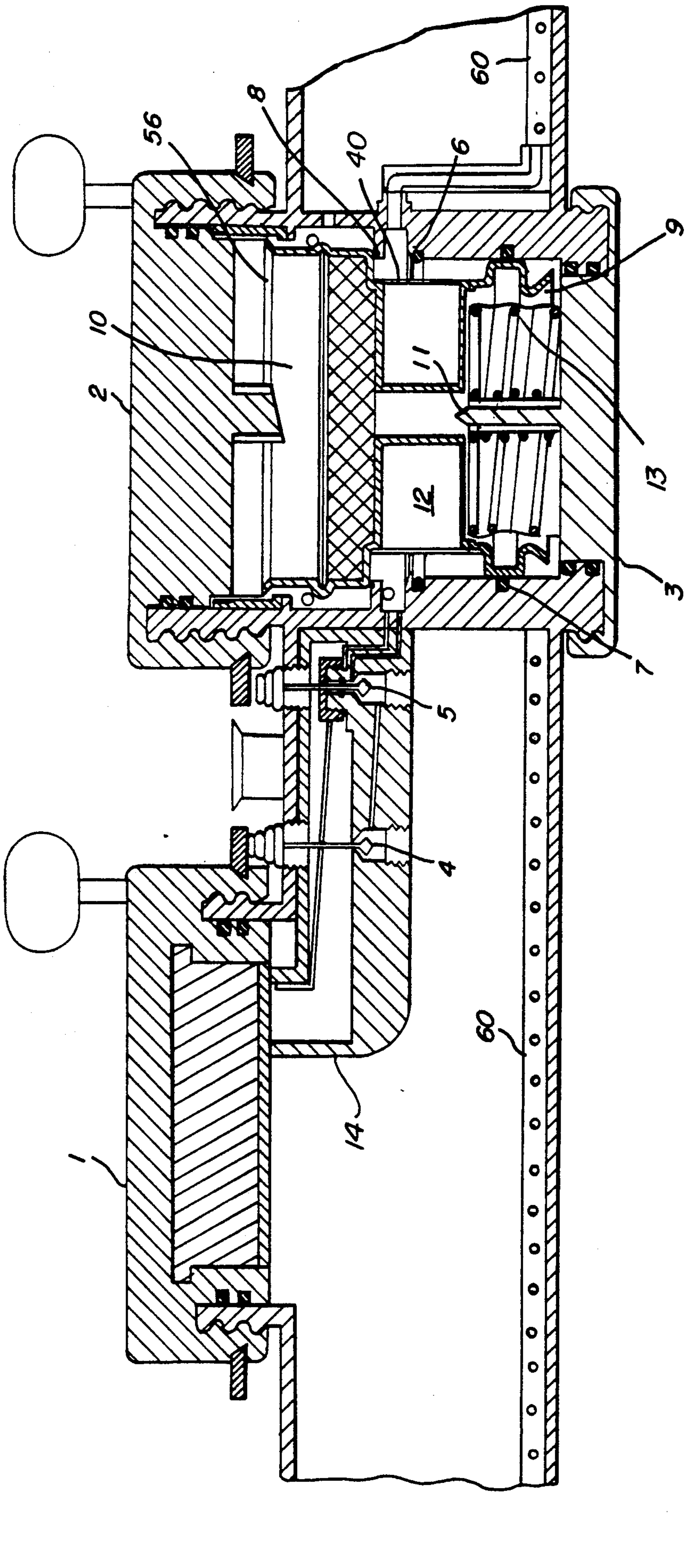
FIG. 4 is a sectional view of another embodiment of a carbonator assembly with the components arranged horizontally.

All the above devices can easily be fitted into a refrigerator, since they require no electrical connections and are self-sufficient, compact units. However, in certain cases, a horizontal tank may be easier to accommodate in the door of a refrigerator. FIGS. 3A, 3B and 4 illustrate such a system, using the principles already described.

Firstly, in FIGS. 3A and 3B, a suitable gas-generating cartridge 40 is shown. The cartridge 40 consists of a molded plastic shell 42. The top-section is filled with bicarbonate pellets 44, the middle section having a fine outer mesh 18 with pellets containing a mixture of bicarbonate and powdered acid 46 and the lower section contains a liquid acid 48. The top and bottom sections are connected by a tube 50, which is sealed with a foil plug 52 at the bottom and filter paper 54 at the top. The top and bottom of cartridge 40 are closed by sealing foil 56.

FIG. 4 shows a sectional view of the carbonator tank. Lid 1 is removed and the tank is filled with water up to a predetermined mark. The reagent water tank 14 is filled at the same time, as soon as the water reaches the required level. When lid 1 is replaced, the top of the reagent water tank is sealed. Simultaneously, valve 4 is opened by the pressure which lid 1 exerts on a spring valve actuator. However, the water in the reagent tank cannot as Yet flow out, since it is restrained by a second valve 5. Lid 2 is removed and the gas generating cartridge 40 is inserted. The cartridge 40 does not reach its lowest position, being restrained by an o-ring 6. When lid 2 is replaced, the cartridge 40 is punctured on the top sealing foil 56 and forced to its lowest position. In its lowest position, the cartridge 40 seals its base 9 against o-ring 7 and its top section 10 against a seal 8. A spring bellows 13 enters the base of the cartridge displacing the acid into the top section. A spike 11 in the center of the bellows opens the channel to the top section through foil 52.

When lid 2 is fully closed, valve 5 opens automatically and water from the reagent water chamber flows into the carbonating reagent section 12 of the cartridge. $CO_2$ gas is released and flows to sparge tubes 60, carbonating the water to the level predetermined by the quantity of chemicals.

The spring bellows 13 has forced acid in contact with bicarbonate and this also generates $CO_2$, pressurizing the head-space of the tank. As soon as the head-space pressure has reached equilibrium with the spring pressure in the bellows, the spring contracts, the acid returns to the lower chamber and the reaction stops. Thereafter, the process repeats itself, whenever water is drawn out of the carbonator and the head-pressure drops.

Figure 5A:
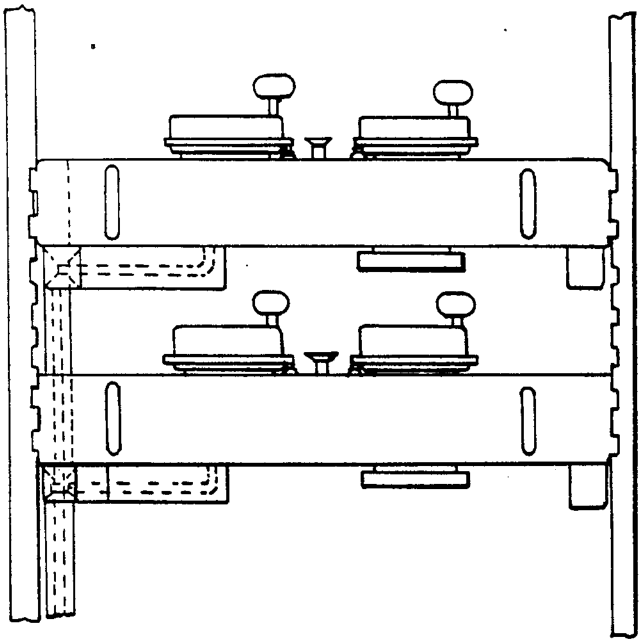
FIGS. 5A and 5B illustrate how the carbonator assembly of FIG. 4 could be mounted in the door of a home refrigerator.
Figure 5B:
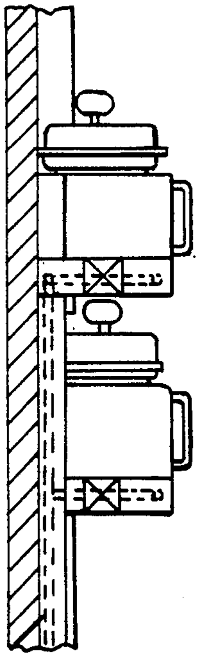

FIGS 5A and 5B show a typical installation of a horizontal carbonator tank in a refrigerator. The tank can now be connected to a dispensing point within or outside the refrigerator.

The above principles can also be applied to a vertical carbonator. They also illustrate how a liquid acid may also be used, in place of a solid acid, and how an external fixed pressure reference may be applied in place of the self-generated internal reference as described in FIGS. 1 and 2. The external pressure reference can be by spring pressure (as above), or by an air-cushion or by a membrane or by a piston or by come other similar pressure-exerting device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An article of manufacture comprising:

a) carbonator means including a water reservoir for containing a predetermined quantity of water to be carbonated by the mixing of $CO_2$ gas therein;

b) gas generating means including reagents for generating $CO_2$ gas within a gas generating chamber when the reagents chemically react, said gas generating chamber being in fluid communication with the water reservoir in said carbonator means, said reagents including, a fixed quantity of chemicals, said fixed quantity being selected to correspond to an amount necessary to generate enough $CO_2$ gas to carbonate all of said predetermined quantity of water in said water reservoir to a predetermined level, and a separate charge of chemicals which periodically mix to generate $CO_2$ gas for propelling carbonated water from said carbonator means;

c) a pressure regulating chamber in fluid communication with both a gaseous head space in said water reservoir and said gas generating chamber, said pressure regulating chamber including a head space formed therein;

d) valve means for accommodating the flow of carbonated water from said carbonator means when in an open state and preventing the flow therefrom when in a clsoed state; and e) control means responsive to the relative internal pressures between the gaseous head space in said water reservoir, the gas generating chamber and the pressure regulating chamber, for initiating or precluding the mixing of said separate charge of chemicals to initiate or stop the generation of the $CO_2$ gas for propelling carbonated water from said carbonator means to thereby maintain the pressure of propelled carbonated water substantially constant.

2. The article of manufacture of claim 16, further including first and second reagent water, and wherein said fixed quantity of chemicals comprises a fixed quantity of solid carbonating chemicals;

said first reagent water being disposed in a first reagent chamber separate from said gas generating chamber but in fluid communication therewith;

said solid carbonating chemicals being disposed in said gas generating chamber;

means for initiating carbonation by emptying the full amount of said first reagent water in said first reagent chamber into said gas generating chamber, and into contact with said solid carbonating chemicals;

said separate charge of chemicals including solid propellant chemicals disposed in said gas generating chamber but separated from said solid carbonating chemicals;

said second reagent water being disposed in a second reagent chamber separate from said gas generating chamber but in fluid communication therewith, said water being transportable to said gas generating chamber;

said first reagent water in said first reagent chamber being of a sufficient quantity to contact only said fixed quantity of solid carbonating chemicals but not the separate charge of solid propellant chemicals;

the total amount of first and second reagent water in said first and second reagent chambers, when emptied into said gas generating chamber, being sufficient to contact both said solid carbonating and solid propellant chemicals;

whereby the water in said water reservoir can be fully carbonated by said solid carbonating chemicals before the second reagent water from said second reagent chamber contacts said solid propellant chemicals.

3. The article of manufacture of claim 2, wherein said water reservoir has a removable lid, for covering an entrance opening through which the reservoir is filled, said means for initiating carbonation being responsive to said removable lid being positioned to close said entrance opening, whereby carbonation begins when said entrance opening is closed by said lid.

4. The article of manufacture of claim 3, wherein said pressure regulating chamber is in fluid communication with said second reagent chamber, and further including means for transferring the water in the second reagent chamber to said pressure regulating chamber in response to the closing of said entrance opening by said lid.

5. The article of manufacture according to claim 4, further including a plurality of vent members for selectively venting a head space of said first reagent chamber to said gas generating chamber, for selectively venting a head space of said water reservoir to said gas generating chamber, for venting a head space of said second reagent chamber to said pressure regulating chamber, and for selectively venting a head space of said pressure regulating chamber to said gas generating chamber.

6. The article of manufacture of cliam 3, wherein said carbonating means and said pressure regulating means each include side walls and whereins aid means for initiating carbonation includes a plurality of valve control rods housed within the side walls of each said carbonator means and said pressure regulating chamber, a first oen of said plurality of valve control rods being operatively connected to a first valve member whereby closing of said lid depresses the first valve control rod thereby actuating said first valve for emptying reagent water in said first reagent chamber into said gas generating chamber through said first valve member, wherein removal of said lid releases actuation of the first valve control rod thereby precluding passage of water from said first reagent chamber into said gas generating chamber.

7. The article of manufacture of claim 6, wherein a second one of said plurality of valve control rods is operatively conncted to a second valve member whereby closign fo said lid comprseses the second valve control rod thereby actuating said second valve for transporting reagent water form said second reagent chamber into said pressure regulating chamber through said second valve member and wherein removal of said lid releases actuation of the second valve control rod thereby precluding transportation of reagent water from said second reagent chamber into said pressure regulating chamber.

8. The article of manufacture according to claim 7, wherein said second valve control rod actuates a toothed rack and pinion arrangement thereby enabling fluid communication between said second reagent chamber and said pressure chamber means via said second valve member.

9. The article of manufacture according to claim 6, wherein a third one fo said plurality of valve control rods is operatively connected to third and fourth valve members whereby closing of said lid depresses the third valve control rod thereby enabling selective meanual operation of said third and fourth valve members, said third valve member enabling fluid communication of said pressure regulating chamber with said gas generating chamber and said fourth valve member enabling venting of said gas generating chamber to a head space fo said carbonator means, whereby fluid communication through said third valve member precludes venting through said fourth valve member and wherein venting through said fourth valve member precludes fluid communication through said third valve member.

10. The article of manufacture according to claim 9, wherein said third valve control rod moves a leaf spring into engagement with a ratchet and further including a switch for manually rotating said ratchet against said leaf spring wherein the switch is positionable in both carbonate and dispense modes.

11. The article of manufacture according to claim 6, wherein said first valve control rod actuates a toothed rack which in turn rotates a pinion thereby enabling fluid communication between said first reagent chamber and said gas generating chamber via said first valve member.

12. The article of manufacture according to claim 1, wherien said control means comprises:

a three-way valve for selective communication with at least two of said gas generating chamber, pressure regulating chamber, and a vent connecting the head space of said pressure regulating chamber to said gas generating chamber, a two-way valve for selective communication with said gas generating chamber and a vent connecting a head space of said water reservoir to said gas generating chamber, a first reagent water chamber in selective fluid communication with said gas generating chamber, means for venting gas from said gas generating chamber to a head space of said first reagent water chamber, a second reagent water chamber in selective fluid communication with said pressure regulating chamber, means for venting gas from said pressure regulating chamber to head space of said second reagent water chamber, wherein when said three-way valve enables fluid communication between said gas generating chamber and said pressure regulating chamber and said two-way valve enables fluid communication between said gas generating chamber and the head space of said water reservoir, water is dumped from said pressure regulating chamber into said gas generating chamber for generating a predetermined amount of $CO_2$ gas, the $CO_2$ gas being vented to the head space of said water reservoir for dispensing of carbonated water therefrom, wherein when said three-way valve enables communication between said gas generating chamber and the head space of said pressure regulating chamber and said two-way valve is closed, $CO_2$ gas generated within said gas generating chamber is vented to the head space of said pressure regulating chamber until an equilibrium is reached therebetween, and means, operable upon generating $CO_2$ gas within said gas generating chamber, for directly sparging $CO_2$ gas into water within said water reservoir until the chemical reaction for generating a predetermined amount of $CO_2$ gas and the separate charge of chemicals within said gas generating chamber is completed.

13. The article of manufacture according to claim 12, wherein said means for directly sparging gas into water within the water reservoir includes a diffuser member placed in contact with water of the water reservoir for gradually releasing $CO_2$ gas into the water.

14. The article of manufacture according to claim 12, further including a switch for selecting one of a carbonator operation and a dispense operation, said switch enabling simultaneous operation of said two-way valve and said three-way valve for initiating and interrupting said control means.

15. The article of manufacture according to claim 12, wherein said two-way valve and said three-way valve are simultaneously operable by a single control switch movable between dispense and carbonate positions, said dispense position enabling operation of said valve means and said carbonate position preventing operation of said valve means for accommodating the flow of carbonated water from said carbonator means and initiating carbonation within said gas generating chamber.

16. An article of manufacture comprising:

a) carbonator means including a water reservoir for containing water to be carbonated by the mixing of $CO_2$ gas therein; and b) gas generating means including reagents for generating $CO_2$ gas within a gas generating chamber when the reagents chemically react, said gas generating means being in fluid communication with the water reservoir in said carbonator means, said reagents including, a fixed quantity of chemicals, said fixed quantity being selected to correspond to an amount necessary to generate enough $CO_2$ gas to carbonate all of said predetermined quantity of water in said water reservoir to a predetermined level, and a separate charge of chemicals which periodically mix to generate $CO_2$ gas for propelling carbonated water from said carbonator means.

17. The article of manufacture of claim 16, further including first and second reagent water, and wherein said fixed quantity of chemicals comprises a fixed quantity of solid carbonating chemicals;

said first reagent water being disposed in a first reagent chamber separate from said gas generating chamber but in fluid communication therewith;

said solid carbonating chemicals being disposed in said gas generating chamber;

means for initiating carbonation by emptying the full amount of said first reagent water in said first reagent chamber into said gas generating chamber, and into contact with said solid carbonating chemicals;

said separate charge of chemicals including solid propellant chemicals disposed in said gas generating chamber but separated from said solid carbonating chemicals;

said second reagent water being disposed in a second reagent chamber separate from said gas generating chamber but in fluid communication therewith; and said first reagent water in said first reagent chamber being of a sufficient quantity to contact only said fixed quantity of solid carbonating chemicals but not the separate charge of solid propellant chemicals;

the total amount of first and second reagent water in said first and second reagent chambers, when emptied into said gas generating chamber, being sufficient to contact both said solid carbonating and solid propellant chemicals;

whereby the water in said water reservoir can be fully carbonated by said solid carbonating chemicals before the second reagent water from said second reagent chamber contacts said solid propellant chemicals.

18. The article of manufacture of claim 17 wherein said water reservoir has a removable lid, for covering an entrance opening through which the reservoir is filled, said means for initiating carbonation being responsive to said removable lid being positioned to close said entrance opening, whereby carbonation begins when said entrance opening is closed by said lid.

19. An article of manufacture comprising:

a water reservoir having first and second adjacent reagent water compartments formed therein;

means for simultaneously filling said water reservoir and said first and second reagent water compartments;

means for sealing said water reservoir and said first and second reagent water compartments;

gas generating means for generating $CO_2$ gas in first and second stages within a gas generating chamber;

first valve means for providing selective fluid communication of said first reagent water compartment with said gas generating means, wherein actuation of said first valve means introduces reagent water from said first reagent water compartment into said gas generating means, thereby generating said first stage of $CO_2$ gas;

means for introducing said first stage of $CO_2$ gas from said gas generating means into said water reservoir, thereby carbonating still water therein;

a pressure regulating means for maintaining a predetermined head space pressure in said water reservoir, said pressure regulating means including a water chamber;

second valve means for providing selective fluid communication of said second reagent water compartment with the water chamber of said pressure regulating means, wherein actuation of said second valve means introduces reagent water from said second reagent water compartment into the water chamber;

third valve means for providing selective fluid communication of the water chamber with said gas generating means, whereby subsequent to carbonation of water in said water reservoir, said third valve means is actuable to introduce water from the water chamber into said gas generating chamber, thereby generating a second stage of $CO_2$ gas; and fourth valve means for selectively introducing at least a portion of the second stage of $CO_2$ gas into a head space of said water reservoir only upon depletion of at least a corresponding portion of the carbonated water from said water reservoir, whereby pressure in the head space of said water reservoir is in a balanced equilibrium with a pressure of the second stage of $CO_2$ gas.

20. The article of manufacture according to claim 19, wherein said gas generating means includes a cartridge having a first reagent for producing said first stage of $CO_2$ gas and a second reagent for producing said second stage of $CO_2$ gas, said first and second reagents being separated by an air gap.

21. The article of manufacture according to claim 20, wherein said first and second reagents are both comprised of bicarbonate and powdered acid.

22. The article of manufacture according to claim 19, wherein said means for simultaneously filling includes an opening formed in a top portion of said carbonator and wherein said means for sealing includes a screw-threaded lid fastenable to said opening.

23. The article of manufacture according to claim 22, wherein selective actuation of said first and second valve means includes fastening of said lid to said opening, said first and second valve means each including a spring member which is compressed upon application of said lid and released upon removal of said lid.

24. The article of manufacture according to claim 19, wherein said means for introducing said first stage of $CO_2$ gas into said water reservoir includes at least one $CO_2$ diffuser positioned on an interior floor of said water reservoir and in fluid communication with said gas generating means.

* * * * *